United States Patent [19]

Paine et al.

[11] Patent Number: 5,614,305
[45] Date of Patent: Mar. 25, 1997

[54] IMPACT AND PERFORATION RESISTANT COMPOSITE STRUCTURES

[75] Inventors: Jeffrey S. N. Paine; Craig A. Rogers, both of Blacksburg, Va.

[73] Assignee: Virginia Tech Intellectual Properties, Inc., Blacksburg, Va.

[21] Appl. No.: 385,547

[22] Filed: Feb. 8, 1995

[51] Int. Cl.$^6$ .................................................. B32B 5/12
[52] U.S. Cl. ............................ 428/301.1; 427/412.1; 428/105; 428/113; 428/408; 428/413; 428/902; 428/911; 428/418
[58] Field of Search ................................ 428/246, 256, 428/285, 902, 911, 408, 105, 113, 413, 418; 427/412.1

[56] References Cited

U.S. PATENT DOCUMENTS

| | | | |
|---|---|---|---|
| 4,696,974 | 9/1987 | Sulc et al. | 525/92 |
| 4,717,341 | 1/1988 | Goldberg et al. | 433/9 |
| 4,767,730 | 8/1988 | Soma et al. | 264/229 |
| 4,909,510 | 3/1990 | Sahatjian | 273/73 R |
| 4,941,627 | 7/1990 | Moscrip | 244/3.21 |
| 5,005,678 | 4/1991 | Julien et al. | 188/378 |
| 5,013,507 | 5/1991 | Julien et al. | 264/219 |
| 5,137,782 | 8/1992 | Adriaensen et al. | 428/370 |

*Primary Examiner*—James J. Bell
*Attorney, Agent, or Firm*—Whitham, Curtis, Whitham & McGinn

[57] ABSTRACT

A fiber reinforced polymer material has improved impact strength and resistance to delamination and perforation when fibers which exhibit martensite phase transformations are incorporated into the composite material. By embedding or "hybridizing" a brittle composite laminate with fibers that exhibit martensite phase transformations, the composite's impact resistance can be improved beyond what is presently possible. During an impact event, high localized stresses are formed at the point of object and laminate contact. By undergoing a stress-induced martensite phase transformation, the fibers which exhibit martensite phase transformations dissipate a large amount of strain energy. The phase transformation enables the fibers to accommodate up to 8% reversible strain and up to 20% ultimate strain. The impact energy is more readily dissipated by the fibers which exhibit martensite phase transformations than by the host composite material or by other hybridizing materials. Impact strain energy dissipated by the fibers which exhibit martensite phase transformation is not available to initiate damage to the host composite material. Furthermore, the fibers which exhibit martensite phase transformations have higher stiffness and strength properties than conventional composite toughening agents such as elastomers and simple polymers.

18 Claims, 6 Drawing Sheets

IMPACT AND PERFORATION RESISTANT COMPOSITE STRUCTURES

This invention was made with U.S. government support under DAAL03-92-G-0180 awarded by the Department of the Army. The U.S. government has certain rights in the invention.

DESCRIPTION

BACKGROUND OF THE INVENTION

1. Field of the Invention

The invention is generally related to composite materials which include fiber reinforcements within a matrix material. More particularly, the invention is directed to improving the impact and perforation resistance of structures formed from composite materials.

2. Description of the Prior Art

Composite material laminates made from layers of carbon or graphite reinforcement fibers and a thermosetting polymer matrix generally have poor resistance to impact. Unlike metals which can deform plastically to dissipate impact energy, the stiff, highly-elastic composites generally lack a mechanism to dissipate energy beyond their yield or ultimate strength (see, Cantwell et al., *Composites*, 1991, Vol. 22, No. 5, pp. 347–362). The excess impact energy generates matrix cracks, ply delaminations, and, eventually, fiber breakage in the laminated composite materials and finally perforation. For thin laminate structures, the resulting damage (delaminations, cracks and fiber breakage) is often on the opposite side of the impact surface and, therefore, hidden from visual inspection (see, Cantwell et al., *Composites Science and Technology*, 1990, Vol. 38, pp. 119–141). For these and other reasons, impact damage resistance and damage tolerance are often limiting criteria when composites are considered for critical load bearing applications or impact puncture resistant armor applications.

A specific area of weakness in graphite reinforced composites is related to perforation resistance once damage has progressed in the composite beyond the delamination phase. However, few methods are known for reducing fiber fracture and material puncture once elastic strain energy storage capacity of the fibers has been exceeded.

Adding elastomeric compounds to the composite matrix ("rubber toughening"), interleaving thermoplastic layers into the composite laminate, using tougher reinforcing fibers, and hybridizing the composite laminate with tough aramid or polyethylene fibers are all methods that have been used to toughen graphite/epoxy composite laminates and increase perforation resistance. Various amounts of success have been attained using these methods; however, the results are not altogether satisfactory. Generally, the techniques work on the principle of increasing the capacity of the composite laminate to absorb or dissipate strain energy. Increasing the amount of strain energy that the composite laminate can dissipate elastically or inelastically before damage occurs reduces the amount of impact energy that remains to damage the laminate.

A shape memory alloy (SMA) is a metallic material which undergoes a transformation Go a martensite phase. In the martensite condition, the metallic material can be deformed in what appears to be a plastic manner; however, the material is actually deforming as a result of the growth and shrinkage of self-accommodating martensite plates. Recovery from the deformation results when the alloy is returned to its parent phase; hence, the name "shape memory alloy".

Shape memory alloys have been used in a wide variety of products including mechanical actuators, medical devices, and various control systems. Several examples of shape memory alloys are found in the patent literature. U.S. Pat. No. 4,717,341 to Goldberg discloses the use of the shape memory alloy, Nitinol, in orthodonic appliances. U.S. Pat. No. 4,909,510 to Sahatjian discloses a tennis racquet netting material made from a metal alloy which exhibits stress-induced martensite-martensite transformation of super elastic or psuedo elastic behavior, such as Nitinol or the like. U.S. Pat. No. 4,941,627 to Moscrip discloses the use of shape memory alloys in the fins of guided projectiles. U.S. Pat. No. 5,005,678 to Julien et al. discloses the use of shape memory alloys in an apparatus responsible for sensing and damping vibrations. U.S. Pat. No. 5,013,507 to Julien et al. discloses a method of producing a passage within a plastic material wherein a shape memory alloy is embedded into a molded plastic article, and, after hardening of the plastic, the shape memory alloy is pulled from the article to create a passage, whereby pulling the shape memory alloy causes it to elongate and assume a stress-induced matensitic state.

Shape memory effects can also be observed with other materials besides metal alloys. For example, U.S. Pat. No. 4,767,730 to Soma et al. discloses a ceramic shape memory element which employs zirconia within the matrix. U.S. Pat. No. 4,696,974 to Sulc et al. discloses a silicone composite that includes a powdered hydrophilic filler which has shape memory properties.

SUMMARY OF THE INVENTION

It is an object of this invention to provide a composite material having superior impact and perforation resistance that includes fiber materials which exhibit martensite phase transformation.

It is another object of this invention to provide a mechanism for improving the impact and perforation resistance of polymer composites by using a hybrid mixture of fiber reinforcements which includes a small percentage of fiber materials which exhibit martensite phase transformation.

It is another object of this invention to provide a method for reducing composite ply delamination in multilayer fiber reinforced composite structures by including fibers which exhibit martensite phase transformation in the multilayer fiber reinforced composite structure.

It is another object of this invention to provide a method of increasing the impact puncture resistance of composite materials by including fibers which exhibit martensite phase transformation in the composite.

According to the invention, it has been discovered that impact damage to a fiber reinforced composite material can be reduced significantly, and the composite material's resistance to impact perforation at various velocities can be improved significantly, if fibers which exhibit martensite phase transformation are embedded in or joined to the surface of the composite material. Comparative tests have demonstrated that the improvements in impact and perforation resistance achieved when a composite material is hybridized with SMA fibers are far superior to those which result when other tough fibers, such as aramid fibers (Kevlar®), and aluminum, are used.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
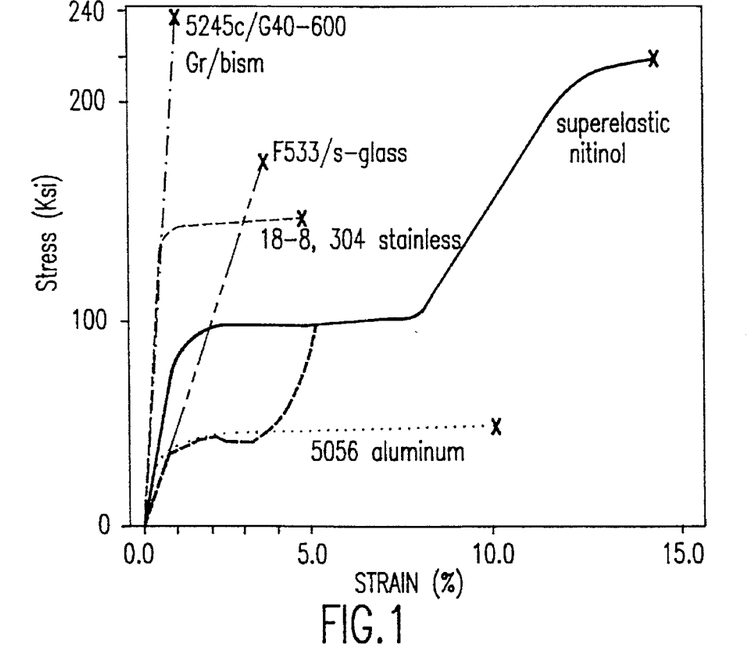
FIG. 1 is a graph showing the stress-strain relationships for a variety of materials.

FIG. 1 shows the relationship of stress to strain for a variety of materials. Like some ductile metals, an SMA like nitinol is very tough, as characterized by the area under the load-deflection curve. SMA materials absorb and dissipate a relatively large amount of strain energy through the martensitic phase transformation. Superelastic nitinol, which is defined as nitinol in the high temperature phase, undergoes a stress-induced phase transformation which enables it to experience up to 8% reversible strain and 20% ultimate strain. Depending on the alloy, some experiments have demonstrated failure stress levels for superelastic nitinol SMA in the range of 200–250 Ksi. FIG. 1 shows that SMAs such as superelastic nitinol can absorb a large amount of strain energy compared to brittle composite material. FIG. 1 also shows the toughness of some steel and aluminum. Traditional ductile metals have the ability to dissipate large amounts of energy through plastic yielding before fracture. In contrast to metals, superelastic SMAs dissipate energy first through reversible martensitic phase transformation and then through plastic yielding and phase transformation after exceeding 6–8% strain.

This invention is directed to the discovery that incorporating fibers which exhibit martensitic phase transformation, such as SMAs, within or on the surface of a polymer composite material will greatly reduce impact damage (delamination, etc.) and greatly improve the material's resistance to perforation. Experiments discussed below are presented for exemplary purposes, and it should be understood that the choice of materials, choice of fibers, arrangement of fibers, and other parameters of the composite, can be varied widely within the practice of this invention. Comparative test results presented below demonstrate that the improvements in impact damage and perforation resistance attained with SMAs were far superior to that which resulted when other tough fibers, such as aramid and metal fibers, were used. Preferably, the SMAs are incorporated with the composite material at a fiber concentration ranging between 0.25–20% by volume, and most preferably 1–4% by volume.

EXAMPLE 1

A series of impact damage studies were performed using a composite that incorporated SMA fibers within the multilayer stack of fiber reinforced polymer plys.

Figure 2:
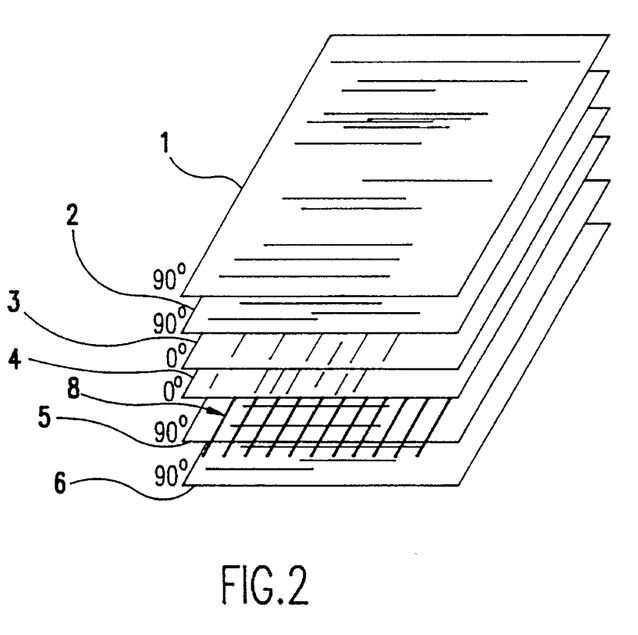
FIG. 2 is an isometric view of a six ply lay up used for impact resistance and delamination tests wherein the SMA fibers are incorporated within the multilayer composite.

FIG. 2 shows the lay up used in these studies. The stack is constructed in a "cross-ply" configuration wherein the top two layers 1 and 2 are oriented with the reinforcing fibers directed along the same axis as the bottom two layers 5 and 6, and with the middle two layers 3 and 4 oriented with the reinforcing fibers directed along an axis perpendicular to the top two layers. "Cross-ply" configurations like that shown in FIG. 2 are known, and have the benefit of making the composite material produced more anisotropic.

In the impact damage tests, fibers 8 which exhibit martensite phase transformation were incorporated within the stack between layers 4 and 5. The impact tests demonstrated that including fibers 8 which exhibit martensite phase transformations in the composite results in a composite of superior impact damage and delamination resistance. In operation, impact induced high localized stresses generate a phase transformation in the embedded fibers 8, which, in turn dissipate impact strain energy from the host composite material and improve the impact resistance of the composite.

Figure 3:
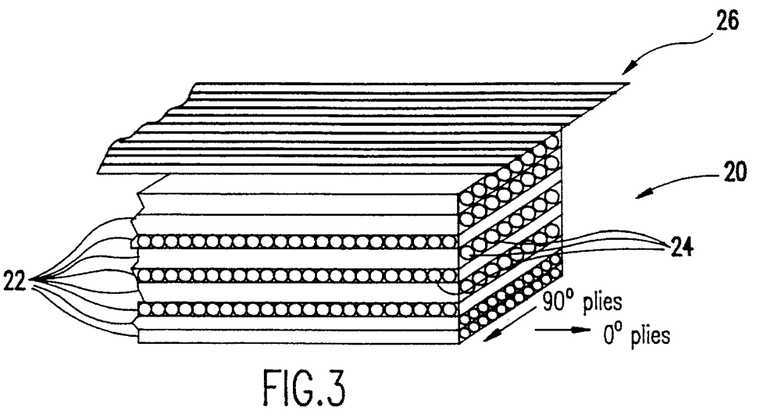
FIG. 3 is an isometric view of a multilayer lay up used for perforation resistance tests wherein the SMA fibers, as well as other "tough" fibers used in comparative studies, were joined to the surface of the composite materials.

It should be understood that the multi-ply composite described in conjunction with FIG. 2 can be varied considerably within the practice of this invention. For example, more or less plys can be used to form a composite structure, the fibers 8 can be positioned between different and/or multiple plys in a stack, or can be positioned on a surface of the stack as is shown in FIG. 3 (which is the lay up used for the perforation studies), or can be intermingled with fibers in the prepreg material of any particular ply in a stack, etc. In addition, in the practice of this invention, the fiber orientation of the stacks can be configured differently or even randomly.

The ply configuration presented in FIG. 2 was used to prepare specimens for impact tests and is modeled after the work of Lagace et al., *J. of Reinforced Plastics and Composites*, Vol. 12, May, 1993, pp. 585–601, which discloses there is an especially high susceptibility to impact damage in the cross-ply beams. In the polymer composites which were prepared for impact tests, wide beam specimens were fabricated from graphite/bismaleimide plys. Specifically, a material available from BASF was utilized which is identified as BASF 5245C/G40-600 prepreg. It should be understood that the polymer matrix material in the plys 1–6 can vary widely within the practice of this invention and can include polyimides, polyamides, polymethacrylates, polyethylenes, epoxies, bismaleimides, as well as other polymer compounds. In addition, the reinforcing fiber used in the plys 1–6 can vary widely within the practice of this invention and can include graphite, fiberglass, metals, as well as tough aramid and polyethylene fibers, and a variety of other fiber materials. As discussed above, the fibers 8 could also be intermingled with the fibers of any particular ply of a composite material.

In the polymer composites which were prepared for impact tests, the fibers 8 which exhibit martensite phase transformation which were employed were superelastic, activated nitinol fibers. However, it should be understood that a wide variety of other fibers can be used within the practice of this invention. Table 1 presents a list of alloys which exhibit martensitic effects that could be used as fibers 8 within the practice of this invention.

TABLE 1

Alloys Exhibiting Martensitic Effects

| Thermo-elastic | Pseudo-elastic | Shape Memory | 2-way Shape Memory |
|---|---|---|---|
| Ag—Cd | Ag—Cd | Ag—Cd | Cu—Al |
| Au—Cu—Zn | Au—Cd | Au—Cd | Cu—Zn—Al |
| Cu—Al—Ni | Au—Cu—Zn | Au—Cu—Zn | In—Tl |
| Cu—Zn | Cu—Al—Mn | Cu—Al | Ti—Ni |
| Cu—Zn$^a$ | Cu—Al—Ni | Cu—Al—Ni | |
| Fe—Pt | Cu—Au—Zn | Cu—Zn | |
| Ti—Ni | Cu—Zn | Cu—Zn—Al | |
| | Cu—Zn—Sn | Cu—Zn—Si | |
| | Cu—Zn—X | Cu—Zn—Sn | |
| | Fe$_3$Be | Fe—Pt | |
| | Fe$_3$Pt | Fe—Ni | |
| | In—Tl | In—Cd | |
| | Ni—Ti | In—Tl | |
| | Ti—Ni | Ni—Al | |
| | | Ni—Ti | |
| | | 304 Stainless Steel | |
| | | Ti—Nb | |
| | | Ti—Ni | |

$^a$With ternary additions of Ni, Ag, Au, Cd, In, Ga, Si, Ge, Sn, and Sb

The fibers 8 which were employed had a 0.012 inch diameter. As shown in FIG. 2, the fibers 8 were distributed and laid up with the prepreg at the lower 0°/90° ply interface. The volume fraction of the nitinol fibers in the hybrid beams was 2.8 percent. In the practice of this invention, a hybrid composite material will preferably contain more than 0.25% and less than 10% by volume of the fibers which exhibit martensite phase transformation, and most preferably less than 3% by volume of the fibers which exhibit martensite phase transformation. Materials which exhibit martensite phase transformation are expensive; therefore, limiting the amount used has significant advantages. Furthermore, the test results demonstrated that specimens with a fiber concentration as low as 2.8% by volume exhibited remarkably improved resistance to impact damage and delamination. The ply thickness for the specimens used in the tests was 0.011 inches and the resulting specimen thickness was 0.064 inches after the multi-ply lay up was cured in an autoclave.

The quality of the composite was verified by C-scan after curing and wide beam impact specimens measuring 2×6 inches were cut from the composite for impact tests. The specimens were impacted with a drop weight impact tower device instrumented with a Dynatup 730 data acquisition system. The drop weight was 10.5 lb (4.8 Kg) and had a spherical-nosed impacting tup of 0.625 inches in diameter. Different starting heights were used to attain impact energies of 1.8 to 17 ft-lbs (2.4–23 J). In a first set of experiments, the ends of the specimens were held by simple C-clamps. During the impact event, these specimens slipped significantly out of the clamps due to the large membrane forces. When the specimens slipped, they experienced large deflections with accompanying flexural stresses. Table 2, presented below, identifies the peak impact force and delamination area results for these specimens as "large deflection" specimens. In a second set of experiments, a clamping fixture was used to minimize slippage. The clamping fixture was similar to that used in Lagace et al., *J. of Reinforced Plastics and Composites,* Vol. 12, May, 1993, pp. 585–601, and included eight bolts torqued to 15 ft-lbs on two thick aluminum plates which clamped the ends of the specimens. The overall deflections were significantly lower than for the first set of experiments; therefore, Table 2 identifies the peak impact force and delamination area results for these specimens as "small deflection" specimens. In both sets of experiments, a three inch gage region was provided for the specimens to be impacted.

After impact, the specimens were C-scanned to determine the location and size of the delamination areas. Three different metrics were used to compare the impact response of the hybrid and all-graphite specimens. Visual inspection was used to qualitatively compare the extent of ply delamination and specimen perforation. In this Example, The peak force of impact was determined as described in Adams et al., *SAMPE Journal,* November/December 1986, pp. 10–16, and was used to compare the energy absorption capabilities off the specimens. As will be discussed below in Examples 2 and 3, in the perforation studies, the energy dissipated during puncture was used as a comparative metric. The C-scan detected delamination area due to the impact was used to quantify damage extent.

Visual inspection of the large deflection samples showed that the tup completely perforated the all-graphite specimens at the 13.5 and 17.0 ft-lb energy levels. Conversely, at the same energy levels, the hybrid composites with nitinol fibers were not perforated. In addition, when the samples were viewed from the side, the all-graphite composite had a much larger visible delamination length than the hybrid specimens. Also, there was readily visible, impact-induced laminar cracking in the 7.0 ft-lb all graphite specimen, but not in the hybrid specimen.

Previous researchers have postulated that the formation of delaminations is the result of a "trade-off" between different energy absorbing modes. Either by fiber breakage or delamination, impact energy will be absorbed. Since the hybrid specimens showed less fiber breakage and less delamination damage than the all graphite specimens, it can be concluded that the nitinol fibers are dissipating a significant portion of the impact strain energy.

Visual inspection of the small deflection samples did not show as great a contrast between the all-graphite and the hybrid samples as was observed with the large deflection samples. This is probably due to the low levels of beam deflection. Without the beams deflecting in the clamping fixture, high levels of strain cannot develop in the nitinol fibers. Thus, less energy can be dissipated by the stress-induced-phase transformation as a result. However, like the large deflection results, the highest level of impact energy for the specimens (10.4 ft-lbs for small deflection samples) resulted in complete perforation of the all graphite specimen, but the same energy of impact did not perforate the nitinol fibers of the hybrid composite.

Tables 2 and 3 present the peak impact force and delamination area results for both the large and small deflection samples.

TABLE 2

| Nominal impact energy (ft-lb) | Peak Impact force (lb) | | | |
|---|---|---|---|---|
| | large deflect. | | small deflect. | |
| | Graphite | Hybrid | Graphite | Hybrid |
| 1.8 | 137 | 189 | 302 | 380 |
| 2.6 | | | 402 | 475 |
| 3.5 | 214 | 260 | 444 | 532 |
| 7.0 | 338 | 270 | 460 | 588 |
| 10.3 | 385 | 442 | 419 | 601 |
| 13.6 | 376 | 429 | | |
| 17.0 | 542 | 547 | | |

TABLE 3

| Nominal impact energy (ft-lb) | Delamination Area (in$^2$) | | | |
|---|---|---|---|---|
| | large deflect. | | small deflect. | |
| | Graphite | Hybrid | Graphite | Hybrid |
| 1.8 | 1.8 | 1.4 | 1.8 | 1.3 |
| 2.6 | | | 2.0 | 1.7 |
| 3.5 | 2.2 | 2.2 | 2.2 | 1.7 |
| 7.0 | 3.0 | 2.4 | 4.3 | 3.8 |
| 10.3 | 3.3 | 3.1 | 6.0 | 5.5 |
| 13.6 | 4.8 | 3.9 | | |
| 17.0 | 5.6 | 4.7 | | |

In general, the peak impact force is higher for the hybrid specimens than for the all graphite specimens. Adams et al., *SAMPE Journal*, November/December 1986, pp. 10–16, used the peak impact force as a means to indicate the amount of impact energy the laminates can absorb. Higher peak forces correlate with higher amounts of energy absorption. The results in Table 2 demonstrate that the hybrid specimens generally have higher impact forces and, hence, higher amounts of absorbed energy than the all-graphite specimens. Table 2 also shows that, with the small deflection specimens, the peak impact forces were consistently and significantly higher than the all graphite specimens. The higher impact force represents an advantage in the ability of the hybrid specimens to absorb energy over the all graphite specimens. For the small deflection specimens, the peak impact force decreased slightly after the 7.0 ft-lb of impact energy, and this corresponds to complete perforation of these specimens by the impact tup at higher energy levels. At 10.4 ft-lb, the hybrid, small deflection, specimen was partially perforated, yet the impact force still increased. Thus, it can be concluded that the nitinol fibers dissipate the impact energy most effectively when the undergo large strains and more of the stress-induced-martensic phase transformation occurs. In the event of specimen perforation and large beam deflections, the fibers undergo the requisite large strains.

The delamination area reported in Table 3 was measured from C-scans of the post-impacted composite specimens. The total delamination area reported in Table 3 is the sum of a central delamination and delaminations at the edges of the three inch gage region. Table 3 shows that all-graphite specimens generally had a larger delamination area than the hybrid specimens. This result correlates with the visual inspections. For some of the specimens, the delamination area of the all graphite specimens was 20–25% greater than the delamination are in the hybrids.

EXAMPLE 2

A series of experiments were conducted to determine the ability of a composite layer which includes fibers which exhibit martensite phase transformation positioned on the surface of a fiber reinforced composite, such as graphite and glass reinforced composites, to increase the impact puncture resistance of the combined composite layer/fiber reinforced composite structure.

FIG. 3 shows the lay up used in these studies wherein a base composite 20, comprised of multiple layers 22 of fiber 24 reinforced polymers, is laminated under a hybrid layer 26. In this experiment, the SMAC materials, which can make up the hybrid layer 26, were laminated to the base composite 20 as a surface layer instead of being embedded to facilitate observation of the failure mode for the composite and to simplify fabrication.

In these experiments, the base composite 20 for the hybrid systems was either a graphite/bismaleimide (gr/bis) available from BASF Corp., or a glass/epoxy (gl/ep) available from Hexcel. These base composites are representative of a wide variety of graphite fiber and glass fiber systems. The surface composites that make up the hybrid layer 26 were a custom made nitinol/epoxy (nit/ep) using superelastic nitinol, a kevlar/epoxy (3502/Kevlar-49), and a custom made high strength aluminum wire laminated with epoxy (alu/ep). Because the superelastic nitinol could only be procured in wire form, aluminum was used in the same form for comparison. Both the nit/ep and the alu/ep were produced using drum-winding methods that yielded high quality plies with volume fractions of the wires at approximately 70%. Table 4 presents the material properties for the base composite 20 (top two entries) and the hybrid surface plies (bottom three entries).

TABLE 4

MATERIAL AND BEAM SPECIFICATIONS

| MAT'l | SPECIFICATION | h (in) | Layup | $\sigma_u$ (ksi) | $\epsilon_u$ (%) |
|---|---|---|---|---|---|
| gr/bis | 5245c/g40-600 | .012 | [0$_2$, 90, 0, 90]$_s$ | 230 | 1.0 |
| gl/ep | F533/Eglass | .012 | [0$_2$, 90, 0, 90]$_s$ | 170 | 3.5 |
| nit/ep | Epon828/V40 with 0.19 in nit | .020 | [0]$_1$, [0]$_3$ | 147 | 10.5 |
| alu/ep | Epon828/V40 with .02 in 5056 Aluminum | .024 | [0] | −33 | −8.0 |
| kev/ep | 3502/Kevlar49 | .0065 | [0]$_4$, [0]$_{10}$ | −200 | 2.0 |

FIG. 3 shows the base composite 20 test specimens were fabricated using a cross-ply lay-up with 66% of the plies in the axial direction.

Figure 4:
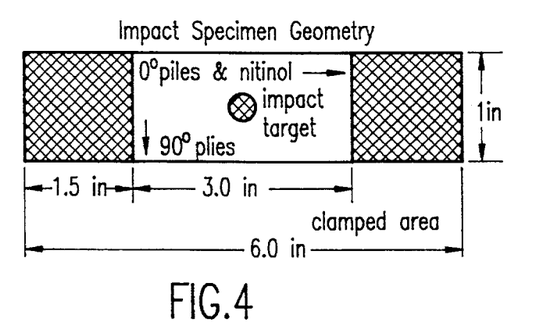
FIG. 4 is a plan schematic view of the clamping geometry used in the impact and perforation resistance studies.

FIG. 4 shows that the test specimens have a length of 6.0 inches, a width of 1.0 inch, and that the clamping area was 1.5 inches on each end to leave a 3.0 inch impact target area. Beam specimens were used to make a future energy analysis simpler and eliminate the need to clamp the specimens in more than one direction. The impact side surface laminates were laid up with all the plies in the axial direction. The hybrid surface plies 26 were laminated the graphite and glass substrates 20 using standard cure methods (vacuum bag cure with Epon 828 resin).

Table 5 provides a specimen "ID" for the different specimens which were tested, as well as provides the number of tests (no.) and the thickness of the specimens (h). The test variables included surface layer type, thickness of the kevlar and nitinol surface layers, and of the graphite substrate.

TABLE 5

| Spec. ID | Description | No. | h (in.) |
|---|---|---|---|
| 0.11gr/bis | 0.108" gr/ep | 8 | 0.108 |
| 0.22gr/bis | 0.219" gr/ep | 4 | 0.219 |
| 0.11gr/bis-0.02 nit | 0.108" gr/ep w/ 0.02" nit. layer | 4 | 0.128 |
| 0.11gr/bis-0.05 nit | 0.108" gr/ep w/ 0.05" nit layer | 4 | 0.164 |
| 0.11gr/bis-0.02 alu | 0.108" gr/ep w/ 0.02" alu layer | 4 | 0.128 |
| 0.11gr/bis-0.02 kev | 0.108" gr/ep w/ 0.026" kev layer | 4 | 0.134 |
| 0.11gr/bis-0.06 kev | 0.108" gr/ep w/ 0.062" kev layer | 4 | 0.170 |
| 0.22gr/bis-0.02 nit | 0.219" gr/ep w/ 0.019" nit. layer | 4 | 0.238 |
| 0.11gl/ep | 0.11" gl/ep | 6 | 0.11 |
| 0.11gl/ep-0.02 nit | 0.11" gl/ep w/ 0.02" nit. layer | 4 | 0.130 |
| 0.11gl/ep-0.05 nit | 0.11" gl/ep w/ 0.05" nit. layer | 4 | 0.164 |
| 0.11gl/ep-0.02 alu | 0.11" gl/ep w/ 0.02" alu. layer | 4 | 0.132 |
| 0.11gl/ep-0.02 kev | 0.11" gl/ep w/ 0.025" kev. layer | 4 | 0.135 |
| 0.11gl/ep-0.06 kev | 0.11" gl/ep w/ 0.065" kev. layer | 4 | 0.175 |

As noted above in conjunction with FIG. 4, a "picture-frame" type clamp was used for the impact studies. Particular attention was given to the clamping method to prevent slippage of the beams and to obtain consistent and reliable load-time data for all of the impact specimens. The clamped beam specimens were impacted in the center by a low velocity drop-weight impact tup. The impact tower was connected to a Dynatup 730-I data acquisition system. The energy, velocity, and weight of the impact device were set at 105 ft-lbs, approximately 14 ft/s, and 33 lbs, respectively, in order to assure complete perforation of the specimens. The load-time data during the impact event was collected for each specimen. The Dynatup 730-I system uses a simple integration algorithm on the load-time data to determine the velocity, deflection, and energy dissipated during the impact event as a function of time. The energy dissipated by various composite beam specimens during impact perforation is simply the area under the impact load-deflection curve.

To aid in determining the mechanisms for impact energy dissipation in the composite beams, the load-deflection curve for each of the materials was determined by taking a time average of at least 4 samples. The time averages of the load, deflection, and energy were determined for each specimen type. The amount of energy used to puncture the specimens, the energy at maximum load, and maximum load were determined for each specimen type from the respective force-time curve. Table 6 presents the impact test results for the specimens identified in Table 5. In Table 6, the maximum load is the value of the peak force in pounds-force (lbf) during the impact event. This value has been used by some researchers to determine the point beyond which damage is considered to be "propagating", rather than "beginning to form" The third and fourth columns present the energy dissipated by the specimen at the maximum load ($E_m$) and the total energy needed to completely puncture the specimens ($E_T$), respectively. The total energy of puncture is the parameter that is used below to compare the performance of the various hybrid materials. It represents the amount of energy dissipated by the specimen during the impact perforation event. In theory, any impact of lower energy will not cause complete puncture. Thus, the greater the energy to cause complete puncture, the more damage resistant the material or the more material that will be intact at a subpuncture energy level. The amount of impact energy dissipated by the specimens is the metric by which improvement between materials is measured. Because the thickness of the hybrid and plain composites vary by 15–60%, comparing the energy dissipated by each specimen directly may not yield proper comparisons. Thus, it is appropriate to normalize the energy dissipated by the volume of the specimens (or beam thickness). Under tensile mode fracture, the amount of energy dissipated in materials under impact loading is also a function of volume. Because membrane stresses appear to dominate the impact behavior of thin specimens, Wardle, *Progress in Science and Engineering of Composites,* ICCM-IV, Ed. Hayashi, Tokyo, 1982, pp. 837–844, suggested that such a proportionality exists in impact loading of plate specimens with L/h>25. To test this hypothesis, the thickness of the specimen was used to normalize the energy data. The total energy dissipated by a specimen type in impact is multiplied by the thickness ratio of 0.11 plain specimens to the hybrid specimens as shown in Equation 1.

$$E_T^{vol} = E_T \times \left( \frac{t_{monolithic\ specimen}}{t_{hybrid\ specimen}} \right) \qquad \text{Eq. 1}$$

For example, the 0.11 gr/bis-0.02 nit specimens were multiplied by the ratio 0.108/0.128 or 0.844. Column 5 of Table 6 presents the total energy normalized by the thickness ratio. Some researchers normalize by dividing by specimen thickness and specimen density. The appropriateness of such a normalizing scheme has not been determined, but is presented as the last column in Table 6. This method yields a measure of the amount of impact energy that can be dissipated per unit mass. For applications requiring only maximum impact resistance, such a parameter may be appropriate. However, it may falsely justify using large quantities of lightweight, relatively low impact resistant material instead of using small amounts of heavier, highly impact resistant, materials.

TABLE 6

| | IMPACT TEST RESULTS | | | | |
|---|---|---|---|---|---|
| specimen "ID" | max load (lb) | $E_m$ (ft-lb) | $E_T$ (ft-lb) | $E_T$★ (ft-lb) | $E_T$# (ft-lb) |
| 0.11gr/bis | 1627 | 17.6 | 40.4 | 40.4 | 40.4 |
| 0.22gr/bis | 3435 | 36.7 | 76.8 | 37.9 | 218 |
| 0.11gr/bis-0.02nit | 2030 | 21.3 | 64 | 54.0 | 237 |
| 0.11gr/bis-0.05nit | 2580 | 28.3 | 84.7 | 55.8 | 206 |
| 0.11gr/bis-0.02alu | 1894 | 22.5 | 44.5 | 37.5 | 191 |
| 0.11gr/bis-0.02kev | 2133 | 21.5 | 50.2 | 40.5 | 233 |
| 0.11gr/bis-0.06kev | 3309 | 30.5 | 68.3 | 43.4 | 252 |
| 0.22gr/bis-0.02nit | 4074 | 43.3 | 103.2 | 46.9 | 231 |
| 0.11gl/ep | 3006 | 31.2 | 60.2 | 60.2 | 304 |
| 0.11gl/ep-0.02nit | 3333 | 41.1 | 79.2 | 67.0 | 271 |
| 0.11gl/ep-0.05nit | 3464 | 51.1 | 101.9 | 68.3 | 235 |
| 0.11gl/ep-0.02alu | 3183 | 36.4 | 67.4 | 56.2 | 267 |
| 0.11gl/ep-0.02kev | 3167 | 41.9 | 71 | 57.9 | 309 |
| 0.11gl/ep-0.06kev | 3148 | 48.5 | 86.3 | 54.2 | 296 |

★ = normalized by the ratio of plain specimen to hybrid specimen thickness
\# = normalized by dividing by specimen thickness and specimen density Table 6 demonstrates the relative ability of the hybrid materials to improve the resistance of monolithic gr/bis and glass to perforation.

Figure 5:
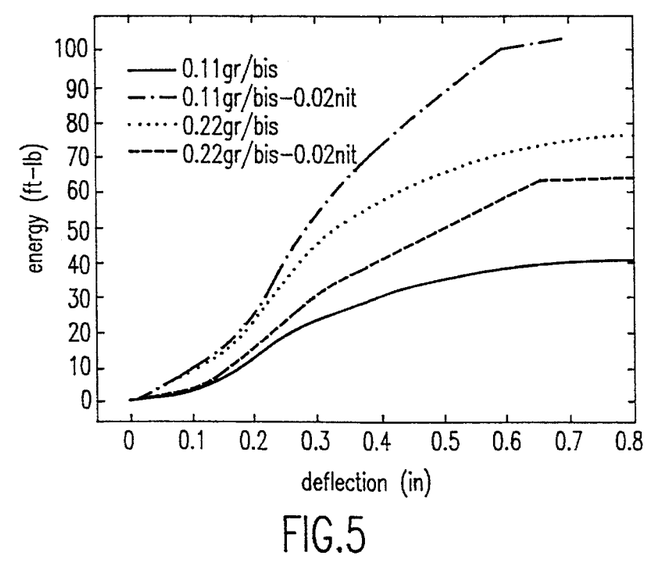
FIG. 5 is a graph showing the energy-deflection curves of 0.11 Gr/bis and 0.22 Gr/bis specimens.

FIG. 5 is provided for exemplary purposes and is directed to the effect of the host composite thickness. FIG. 5 shows the energy-deflection curves for the 0.11 Gr/bis and 0.22 Gr/bis specimens with and without a 0.02 layer of nit/ep. The energy curves represent the amount of total dissipated impact energy as a function of the deflection during the impact event. From the energy curves and the values in Table 6, it can be observed that energy is dissipated in nearly identical fashion for the two thicknesses of plain gr/bis specimens. The energy at max load for the 0.22 gr/bis specimens is about double that of the 0.11 gr/bis specimens and the total energy is nearly double.

Figure 6:
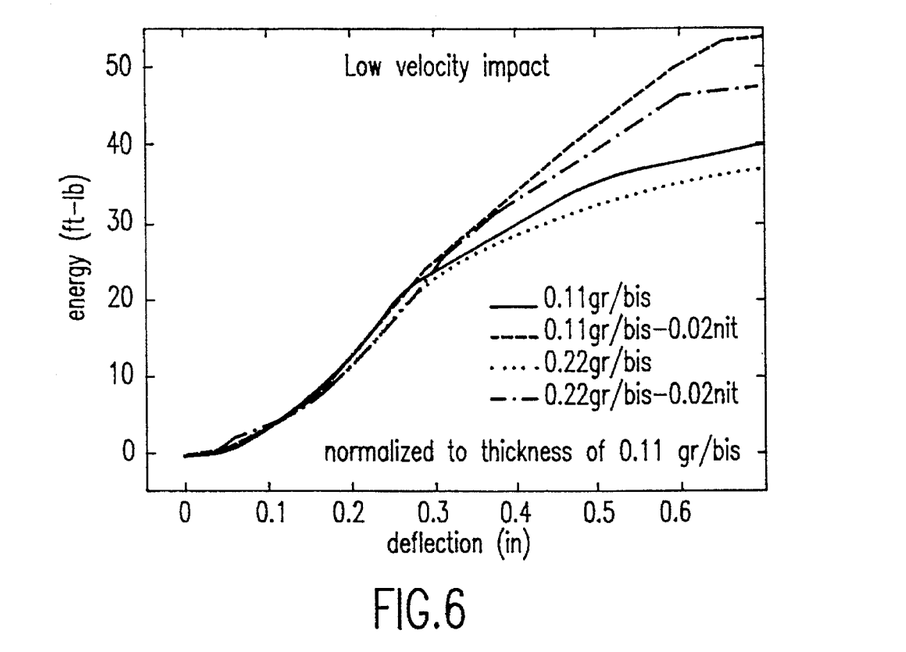
FIG. 6 is a graph showing the normalized energy deflection curves for 0.11 Gr/bis and 0.22 Gr/bis specimens.

FIG. 6 shows the curves which result after normalizing the dissipated energy curves of FIG. 5 by the thickness ratio. The similarity in the amount of dissipated energy for the two plain gr/bis curves is even more pronounced by the normalization. The data shows that the thicker 0.22 gr/bis specimens do not dissipate quite as much energy per unit thickness as the 0.11 gr/bis. This result suggests the thicker specimens are slightly less efficient at dissipating energy than thinner specimens.

FIGS. 5 and 6 demonstrate that the increase in dissipated energy of the nit/ep hybrids over the monolithic gr/bis is substantial. FIG. 5 shows that the nit/ep layer increases the total energy dissipated by 58 and 34 percent compared to the 0.11 and 0.22 gr/bis plain specimens, respectively. The 0.11 gr/bis-0.02 nit specimens have a greater volume fraction (15.6%) than the 0.22 gr/bis-0.02 nit specimens (8.4%). This suggests there is a specific nit/ep volume fraction that is the optimum for increasing the dissipated energy. The normalized data in FIG. 6 does not necessarily reflect the same trend. FIG. 6, shows the nit/ep layer increases the total normalized energy by 37 and 24 percent for the 0.11 and 0.22 gr/bis specimens, respectively. While the ratio of 37 to 24 percent is similar to the ratio of 58 to 34 percent for the non-normalized data, normalizing the data and curves by thickness alone does not reflect the fact that a much smaller volume fraction of nit/ep was used in the 0.22 gr/bis to achieve the increase.

Figure 7:
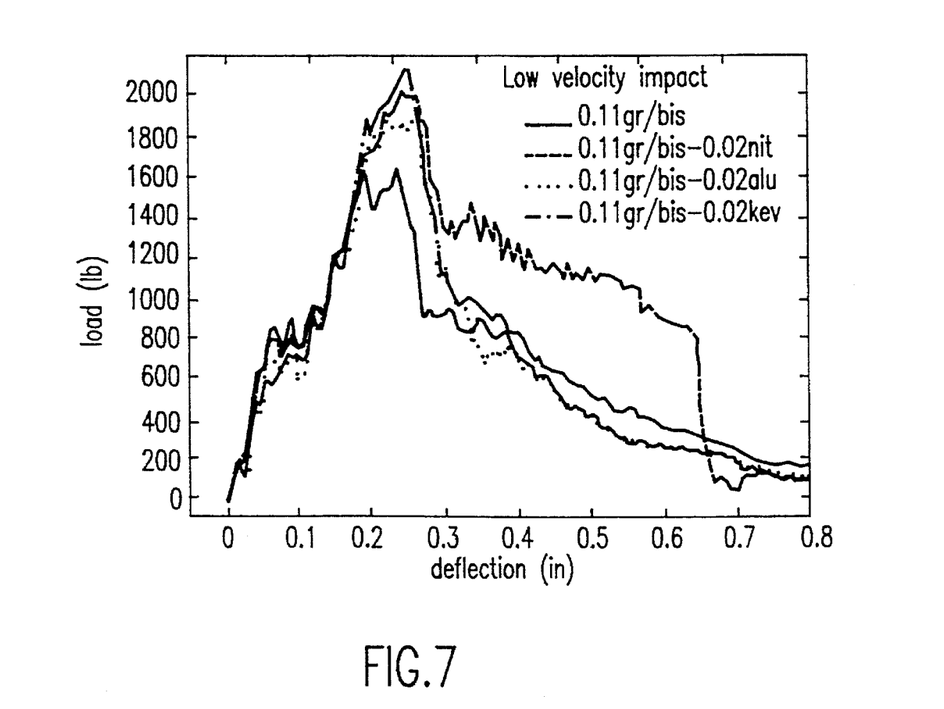
FIG. 7 is a graph showing the load-deflection behavior of the 0.11 Gr/bis hybrid specimens.
Figure 8:
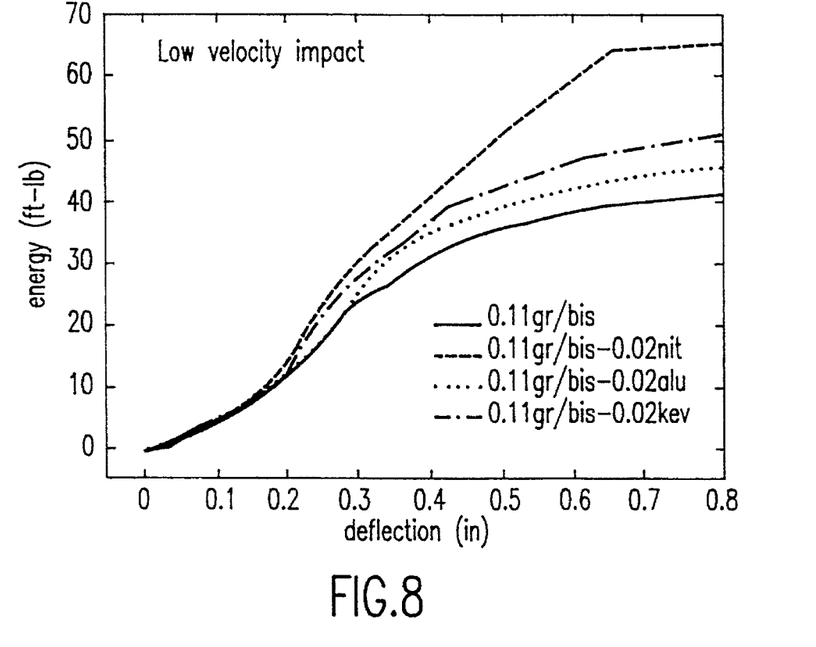
FIG. 8 is a graph showing the energy-deflection performance of the hybrid specimens on 0.11 Gr/bis.

FIGS. 7 and 8 show the load-deflection and energy-deflection behavior during the low velocity impact events for the different types of hybrid 0.11 gr/bis composites, respectively. These Figures and Table 6, demonstrate that the peak impact force of the monolithic 0.11 gr/bis is substantially increased by the presence of the additional hybrid surface layers. While the additional material could be reason for the increase, the increase is not totally consistent with the thickness of the hybrid layers, as is shown in Table 6. The stiffness and type of hybrid surface material affect the peak load. The variation in dissipated energy, which is defined as the area under the load-deflection curve, for the different hybrid materials is distinctly shown in FIG. 7 and is reflected in FIG. 8. All of the hybrid layers increase the dissipated energy. FIG. 7 shows that the alu/ep and kev/ep layers increase the area under the curve only in the peak load region from approximately 0.2 to 0.35 inches of deflection. Thereafter, the additional increase in area under the curve or dissipated energy (FIG. 8) is minimal. The nit/ep hybrid has a much higher load-deflection response and resulting dissipated energy for the deflection range of 03 to 0.65 inches than any of the other materials. This is represented in FIG. 8 by the continual increase in dissipated energy being significantly greater than the other hybrids until a knee in the energy-deflection curve occurs at 0.65 inches of deflection.

Figure 9:
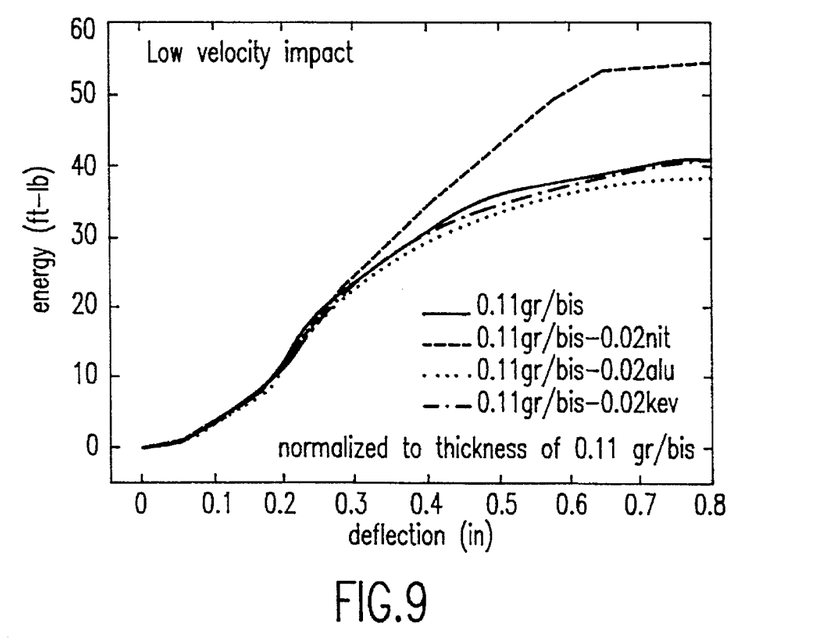
FIG. 9 is a graph showing the normalized energy curves for the curves presented in FIG. 8, which demonstrates that only the nit/ep dissipates more energy than the plain gr/bis.

FIG. 9 presents curves for the normalized dissipated energy, where the curves of FIG. 8 are normalized for the thickness ratio. The normalized maximum dissipated energy values in both FIG. 9 and Table 6 suggest that the alu/ep and kev/ep hybrid surface layers are ineffective at increasing maximum energy dissipated by the material. The effectiveness of the nit/ep in increasing the maximum dissipated energy is clearly demonstrated in FIG. 9. Upon normalizing the data, it can be seen that using a hybrid layer of alu/ep or kev/ep to increase the dissipated energy is little better than simply increasing the gr/bis thickness.

Puncture holes in the test specimens was examined visually. In the monolithic graphite specimens, the impact hole appeared to be a very abrupt punched hole in the top surface resulting in massive fiber shear out and bending. The sharp nature of the impact hole in the top surface indicates that little if any impact load is carried by the top plies of the monolithic graphite to either side of the impact hole. The load is locally applied at the impact site and then applied downward in a conic shaped damage zone through the specimen. In the kevlar specimens, the damage was similar with the kevlar fibers bending at the impact hole rather than shearing off, but still failing locally. In the aluminum fibers, the bending occurred a little further from the impact site than with the kevlar specimens, but the fibers still failed in the classic metallic shear at the local impact site. By contrast, in the nitinol hybrid, interfacial fiber debonding was apparent in the nitinol/epoxy layer along the entire top surface. The debonding is indicative of high strains in the nitinol fibers even at the beam boundaries. Thus, with the nitinol/epoxy layer, the local impact site strain is transferred to the rest of the beam by the nitinol fibers, enabling more of the beam to carry the impact load and changing the damage mode from a local response to a more global response.

In the nit/ep hybrid, the stress plateau was not due to plastic action, but rather a result of the stress-induced martensic phase transformation. Through the phase transformation, the superelastic nitinol can absorb a great amount of strain energy without any Local necking or yielding. The eventual nitinol fracture was actually a brittle type failure where the nitinol breaks in an abrupt fashion with little if any necking. In hybrid nit/ep specimens, very few if any of the nitinol wires (on the order of 5 to 10 wires) actually broke during impact perforation. The failure mode of the hybrid layer was epoxy matrix failure with separation of nitinol wires by the impact tup, and finally fracture of 5–10 wires of nitinol. Because the phase transformation allows the nitinol to elongate without local deformations, the impact energy is distributed and dissipated by a greater beam area.

Figure 10:
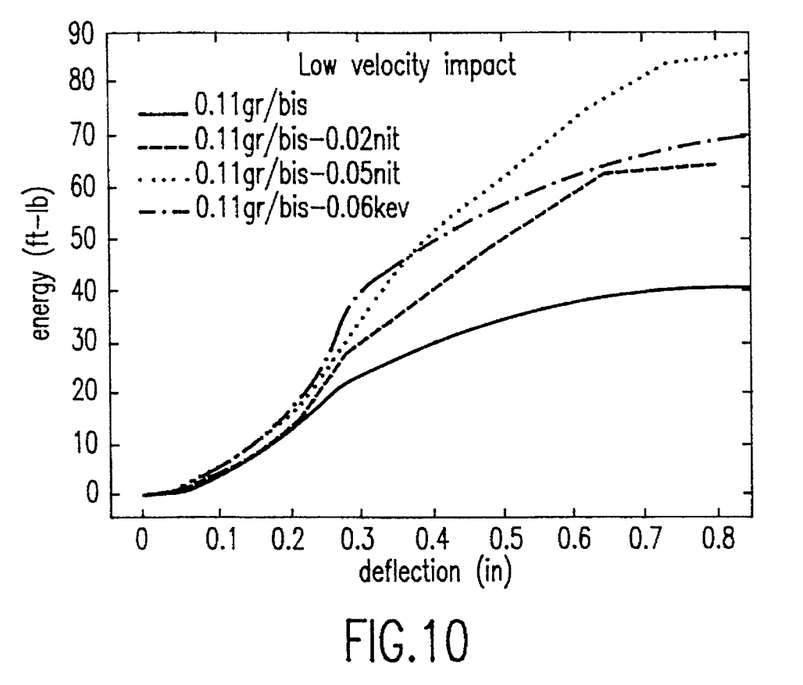
FIG. 10 is a graph showing the energy-deflection performance of the hybrid specimens on Gr/bis with varying hybrid layer thicknesses.
Figure 11:
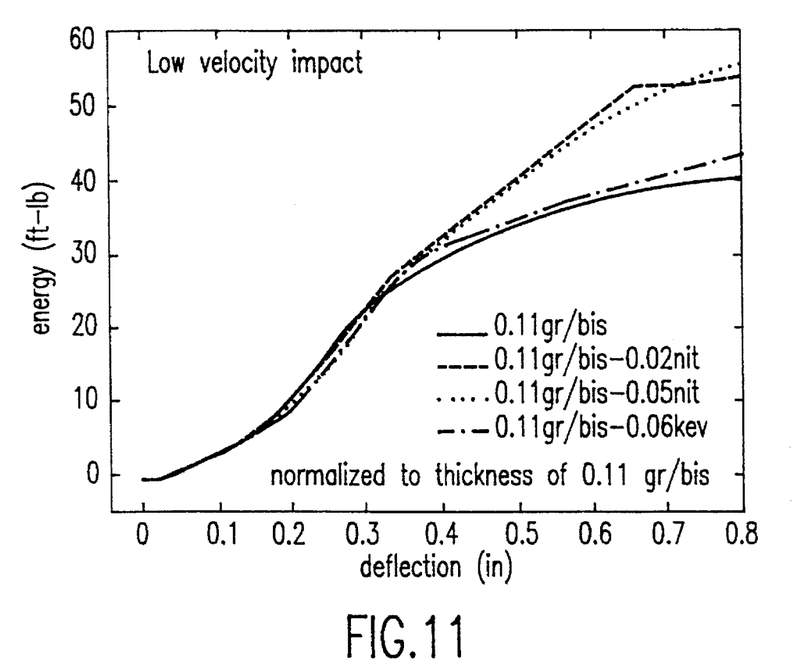
FIG. 11 is a graph showing the normalized energy curves for the curves presented in FIG. 10.

FIGS. 10 and 11 show energy dissipation results with hybrid composites having increasingly thicker hybrid layers or an "increasing volume fraction". Thicker nitinol/epoxy and kevlar/epoxy layers were simply added to the top surface of the composite. Adding a 0.05 inch layer of nit/ep or 0.06 inch layer of kev/ep to the gr/bis increased the dissipated energy by 110 or 69 percent, respectively. As indicated above, hybrids of approximately ⅓ the thickness, or 0.02 inches, had dissipated energy increases of 58 and 24 percent for nit/ep and kev/ep, respectively. However, FIG. 11 shows that the normalized curves and data demonstrate that the hybrid of 0.06 kev/ep layer like the thinner kev/ep layer does not increase dissipated energy much above the energy dissipated in plain gr/bis. The 0.05 hybrid nit/ep demonstrates diminished benefits with the increasing nit/ep hybrid layer thickness.

Similar results to those described above in conjunction with FIGS. 7–11 were achieved with the glass/epoxy specimens. Table 6 presents the results for both the gr/bis and gl/ep specimens. The studies shows that the gl/ep composite had significant impact toughness that can be improved by hybridizing with the nit/ep hybrid layer. No other hybrid materials demonstrated an improvement in the impact resistance. The impact toughness of gr/bis was significantly lower.

Perforation resistance, normalized by volume, was increased by 35% in graphite and 12% in glass using the nitinol epoxy layers. The results demonstrate that hybrid SMA composite specimens have significantly higher impact perforation energies than other hybrids.

EXAMPLE 3

A series of experiments were conducted to determine the ability of a composite layer which includes fibers which exhibit martensite phase transformation to increase the high velocity impact response of a hybrid composite materials. These experiments demonstrate that hybrid composites which include SMA fibers have superior high velocity impact response, and can be used in a wide variety of applications that require reduced perforation under high velocity impact (e.g., bullet proof vests made from materials which incorporate SMA fibers, armored vehicles that include body components made from SMA hybrid composite materials, etc.).

The same material specimens and test clamping fixture described above in Example 2 were used in the high velocity tests discussed herein. Table 7 presents the specimen materials, the thickness of specimens, the number of impact tests, the impact energy ranges and impact velocities over which the specimens were tested.

TABLE 7

MATRIX OF TEST SPECIMENS AND SPECIMEN "ID"

| Specimen ID | Description | h (in) | No. of Specimens | velocity range (ft/s) | impact energy range (ft-lb) |
|---|---|---|---|---|---|
| 0.11gr/bis | 0.108" gr/ep | 0.108 | 14 | 27 to 169 | 7 to 39 |
| 0.11gr/bis-0.02nit | 0.108" gr/ep w/0.020" niti layer | 0.128 | 12 | 139 to 240 | 26 to 79 |
| 0.11gr/bis-0.02alu | 0.108" gr/ep w/0.020" alu layer | 0.128 | 8 | 95 to 150 | 12 to 30 |
| 0.11gr/bis-0.02kev | 0.108" gr/ep w/0.026" kev layer | 0.134 | 12 | 38 to 180 | 2 to 44 |
| 0.11gl/ep | 0.11" gl/ep | 0.110 | 14 | 108 to 218 | 11 to 45 |
| 0.11gl/ep-0.02nit | 0.11" gl/ep w/0.020" niti layer | 0.130 | 14 | 111 to 302 | 17 to 87 |
| 0.11gl/ep-0.02alu | 0.11" gl/ep w/0.022" alu layer | 0.132 | 8 | 140 to 239 | 26 to 54 |
| 0.11gl/ep-0.02kev | 0.11" gl/ep w/0.025" kev layer | 0.135 | 14 | 98 to 255 | 9 to 69 |

A one by three inch composite specimen was clamped into a rigid picture frame clamping fixture in which it was prevented from slipping. As shown in FIGS. 3 and 4, the hybrid nitinol/epoxy, kevlar/epoxy, and aluminum/epoxy layers and the 0° layers of the specimens were oriented in the longitudinal direction of the specimens. To be tested, the clamped impact specimens were mounted in front of a high velocity gas gun barrel. The gas gun fires a 40 or 28 gram hardened steel projectile with a 0.625" diameter hemispherical tip into the beam specimens. The graphite specimens were impacted with a 40 gram projectile and the glass specimens with a 28 gram projectile. The velocity of the projectile was recorded just before impact using light gates. The impact energy is determined by the relationship indicated in Equation 2.

Eq. 2 ENERGY=½mv²

Since the impact projectile is small, it is not instrumented. The amount of energy needed to actually puncture the specimen must then be determined by impacting specimens at increasing energies until the puncture actually occurs. Small increments in impact energy were taken to determine at what energy level complete puncture occurred. In the high velocity loading, complete puncture was defined as the impact energy level at which the impact tup completely stuck in the specimen. For the case of nitinol-glass hybrid, perforation was taken to be the point at which the underlying glass substrate was completely fractured. The impact energy value to cause puncture was taken as the average of the impact energy at which the projectile remained stuck in the specimen and the next lower impact energy before the tup stuck in the specimen. The puncture energy was recorded and used as the comparative parameter. The energy was also normalized by the volume and weight of the specimens to allow for a fair comparison between the various specimens. Equation 3 presents the volume normalization, and is calculated by multiplying the hybrid specimen's impact puncture energy by the ratio of the monolithic specimen thickness to hybrid specimen thickness to get the volume normalized puncture energy.

$$E_T^{vol} = E_T \times \left( \frac{t_{monolithic\, specimen}}{t_{hybrid\, specimen}} \right) \quad \text{Eq. 3}$$

Equation 4 shows that the weight normalized puncture energy is calculated by multiplying the volume normalized puncture energy by the density ratio of the materials.

$$E_T^{\#} = E_T^{vol} \times \left( \frac{\rho_{monolithic\, specimen}}{\rho_{hybrid\, specimen}} \right) \quad \text{Eq. 4}$$

Table 8 presents the impact energy results for completely perforating the 0.11 inch thick monolithic glass and graphite specimens and their hybrids.

TABLE 8

IMPACT ENERGY FOR COMPLETE PERFORATION

| specimen | $E_T$ (ft-lb) | $E_T^{vol}$, (ft-lb) | $E_T^{\#}$, (ft-lb) |
|---|---|---|---|
| 0.11" gr/bis | 23.7 | 23.7 | 23.7 |
| 0.11" gr/bis-0.02" nitinol | 61.0 | 51.6 | 39.1 |
| 0.11" gr/bis-0.03" kevlar | 37.2 | 29.76 | 30.3 |
| 0.11" gr/bis-0.02" aluminum | 26.9 | 22.7 | 21.2 |
| 0.11" gl/ep | 43.8 | 43.8 | 43.8 |
| 0.11" gl/ep-0.02" nitinol | 86.5 | 73.0 | 58.7 |
| 0.11" gl/ep-0.03" kevlar | 65.6 | 52.5 | 55.0 |
| 0.11" gl/ep-0.02" aluminum | 52.5 | 44.3 | 42.9 |

Figure 12:
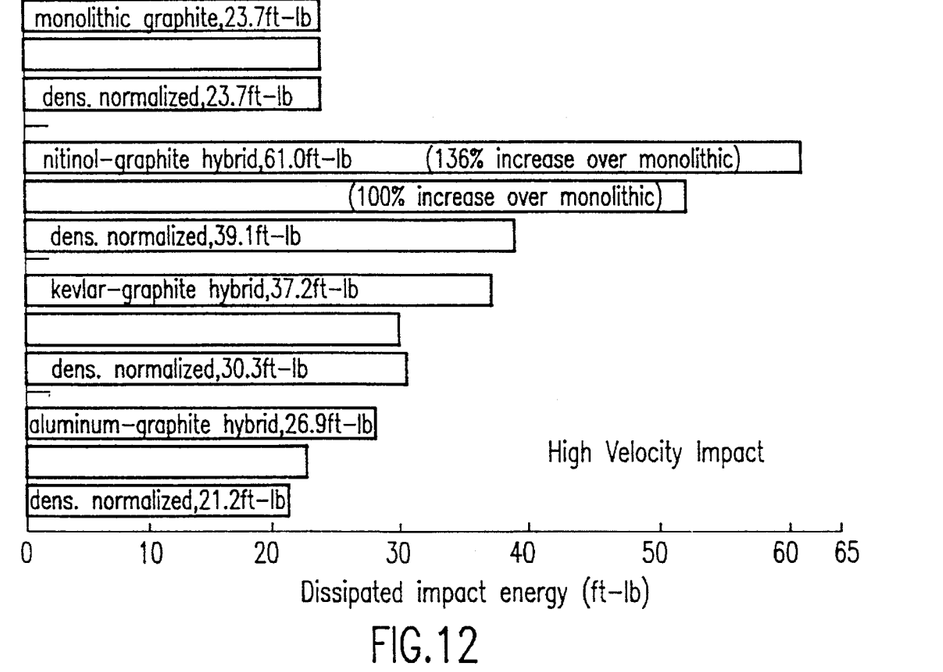
FIG. 12 is a bar graph showing the high velocity impact perforation energies for gr/bis and its hybrid composites.
Figure 13:
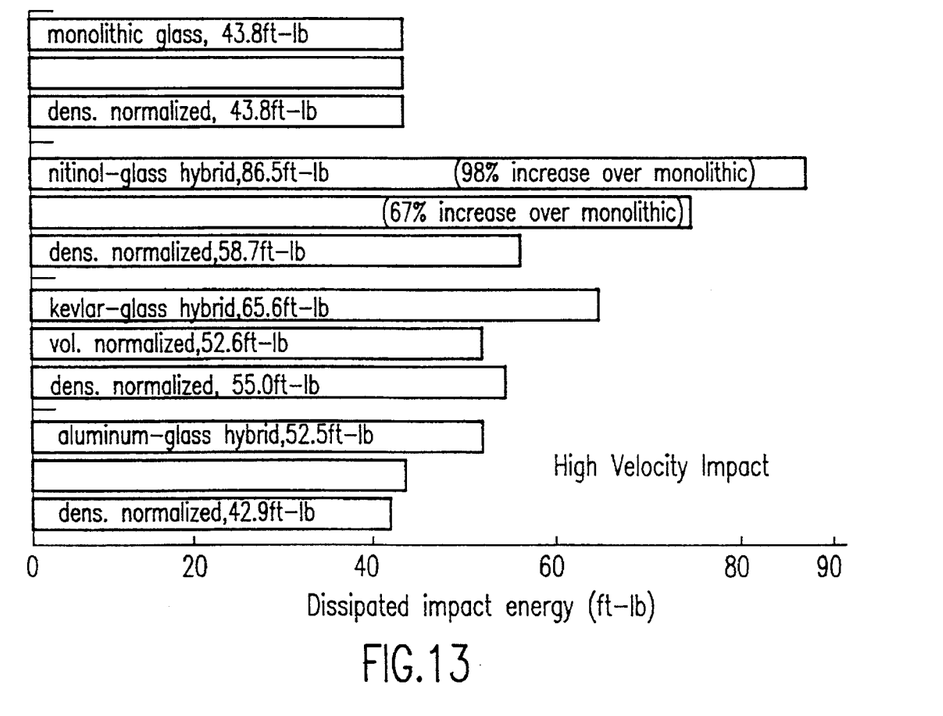
FIG. 13 is a bar graph showing the high velocity impact perforation energies for gl/ep and its hybrid composites.

$E_T^{vol}$ = normalized by the volume ratio; $E_T^{\#}$ = normalized by the density ratio FIGS. 12 and 13 graphically present the information set forth in Table 8. FIGS. 12 and 13 present the energy values normalized by volume and then by density under each of the absolute energy values. The response of the composite materials to high velocity impact shows the same trends as the low velocity impact data discussed in Example 2. As can be seen from FIG. 12, the nitinol-graphite hybrid has penetration energies 160% greater than the monolithic composite. The kevlar also appears to benefit the monolithic graphite in that it increases the perforation energies by almost 60%. When normalized by volume, the nitinol graphite increases the perforation energy by nearly 120% over a monolithic graphite specimen of similar volume. When normalized by density, the nitinol-graphite hybrid increases the impact perforation energy by 65% over a similar weight amount of monolithic graphite. All of the normalization schemes assume that the dissipated energy during impact is linearly related to the thickness and/or volume. The amount of graphite that would be needed to increase impact energy to the nitinol hybrid's level is over 2.5 times the present amount. The kevlar hybrid increase the impact energy by approximately 25% when normalized by volume and weight. This is substantially smaller than is shown by the nitinol hybrid. The aluminum hybrid shows no additional impact energy improvement for the graphite system. As can be seen from FIG. 13, the response of the glass/epoxy composites demonstrates a similar trend. The impact perforation energy is increased by almost 100% over the monolithic glass. When normalized by volume and weight, the nitinol-glass hybrid has a 66% and 34% greater perforation energy than a similar volume and weight of glass composite. By contrast, the kevlar-glass hybrid has a 50% greater perforation energy, and, when normalized by volume and weight, the perforation energy is greater by 25%.

Examples 2 and 3 demonstrate that by hybridizing nitinol elements, the energy to cause material perforation at low velocities is increased by at least 58% in the graphite fiber composite and 35% in the glass fiber composite, and the energy to cause perforation at higher velocities is increased by at least 100% in the graphite fiber composite and 67% in the glass fiber composite.

Examples 1–3 demonstrate that by embedding or "hybridizing" a brittle composite laminate with fibers that exhibit martensite phase transformations, the composite's impact and perforation resistance is improved. During an impact event, high localized stresses are formed at the point of object and laminate contact. By undergoing a stress-induced martensite phase transformation, the fibers which exhibit martensite phase transformations dissipate a large amount of strain energy. The phase transformation enables the fibers to accommodate up to 8% reversible strain and up to 20% ultimate strain. The impact energy is more readily dissipated by the fibers which exhibit martensite phase transformations than by the host composite material. Impact strain energy dissipated by the fibers which exhibit martensite phase transformation is not available to initiate damage to the host composite material.

Composite materials which incorporate fibers which exhibit martensite phase transformations can be used in a wide variety of applications. For example, the materials can be used in bullet proof body armor such as bullet proof vests, in airplane composite structures such as wings and fuselages, and in car and boat parts. The constituents of the composite, including the choice of fibers which exhibit martensite phase transformations and the polymer matrix material, will vary depending on the application.

While the invention has been described in terms of its preferred embodiments, those skilled in the art will recognize that the invention can be practiced with modification within the spirit and scope of the appended claims.

We claim:

1. A composite material having increased impact and perforation resistance, comprising:
   a plurality of plys of a fiber reinforced polymer matrix material cured together to form a composition; and
   a plurality of shape memory alloy fibers which exhibit martensitic phase transformations distributed in said polymer composite.

2. The composite material of claim 1 wherein said plurality of shape memory alloy fibers which exhibit martensitic phase transformations comprises 0.25–20% by volume of said composite.

3. The composite material of claim 1 wherein said plurality of shape memory alloy fibers which exhibit martensitic phase transformations comprises 0.25–3% by volume of said composite.

4. The composite material of claim 1 wherein said plurality of shape memory alloy fibers which exhibit martensitic phase transformations are distributed between two adjacent plys of said plurality of plys of said fiber reinforced polymer matrix material.

5. The composite material of claim 1 wherein said plurality of shape memory alloy fibers which exhibit martensitic phase transformations are distributed on a surface of said fiber reinforced polymer matrix material.

6. The composite material of claim 1 wherein said polymer matrix material is selected from the group consisting of polyimides, polyamides, polymethacrylates, polyethylenes, epoxies, and bismaleimides.

7. The composite material of claim 1 wherein said shape memory alloy fibers which exhibit martensitic phase transformations include elements selected from the group consisting of Ni, Ag, Au, Cd, In, Ga, Si, Ge, Sn, Sb, Zn, Nb, Cu, Fe, Pt, Al, and Tl.

8. The composite material of claim 1 wherein said fiber reinforced polymer matrix materials includes fibers selected from the group consisting of graphite, aramid, metal, glass, and polyethylene.

9. The composite material of claim 1 wherein said shape memory alloy fibers are nitinol.

10. A method for reducing both composite ply delamination and increasing impact perforation resistance in a multilayered polymer matrix composite structure, comprising the steps of:
    identifying a structure formed from a plurality of plys of a fiber reinforced polymer matrix material where enhanced resistance to delamination and impact perforation is desired;
    incorporating a plurality of shape memory alloy fibers which exhibit martensitic phase transformations in said structure formed from a plurality of plys of a fiber reinforced polymer matrix material; and
    curing together said plurality of plys to form a composite material.

11. The method of claim 10 wherein said step of incorporating shape memory alloy fibers which exhibit martensitic phase transformations is performed by placing said fibers between two adjacent plys of said plurality of plys of said fiber reinforced polymer matrix material.

12. The method of claim 10 wherein said shape memory alloy fibers which exhibit martensitic phase transformations comprise 0.25–20% by volume of said composite structure.

13. A method for producing materials which are resistant to high velocity impact perforation, comprising the steps of:
    adding to a fiber reinforced composite material 0.25–20% by volume shape memory alloy fibers which exhibit martensitic phase transformation; and
    curing together said fiber reinforced composite material.

14. The method of claim 13 wherein said step of adding is performed by adding a layer comprised of said shape memory alloy fibers which exhibit martensitic phase transformation and a matrix material to said fiber reinforced composite material.

15. The method of claim 14 wherein said step of adding adds said layer to a surface of said fiber reinforced composite material.

16. The method of claim 14 wherein said step of adding positions said layer between two plys of said fiber reinforced composite material.

17. The method of claim 13 wherein said shape memory alloy fibers are nitinol.

18. The method of claim 13 wherein said shape memory alloy fibers are nitinol.

* * * * *